United States Patent
Christoffersson et al.

(10) Patent No.: US 10,356,373 B2
(45) Date of Patent: Jul. 16, 2019

(54) VEHICLE IMAGE CAPTURE CORPORATION

(71) Applicant: VOLVO CAR CORPORATION, Gothenburg (SE)

(72) Inventors: Joakim Christoffersson, Malmo (SE); Claus Allan Christensen, Kopenhamn (DK); Anna Olesen, Fredriksberg (DK)

(73) Assignee: Volvo Car Corporation, Gothenburg (SE)

( * ) Notice: Subject to any disclaimer, the term of this patent is extended or adjusted under 35 U.S.C. 154(b) by 162 days.

(21) Appl. No.: 14/063,217

(22) Filed: Oct. 25, 2013

(65) Prior Publication Data
US 2014/0125803 A1   May 8, 2014

(30) Foreign Application Priority Data
Nov. 7, 2012   (EP) .................................. 12191668

(51) Int. Cl.
| | | |
|---|---|---|
| *H04N 7/18* | (2006.01) | |
| *B60R 11/04* | (2006.01) | |
| *G01C 21/26* | (2006.01) | |
| *G01C 21/36* | (2006.01) | |

(52) U.S. Cl.
CPC ............. *H04N 7/188* (2013.01); *B60R 11/04* (2013.01); *G01C 21/26* (2013.01); *G01C 21/3602* (2013.01)

(58) Field of Classification Search
CPC ..... B60R 11/04; G01C 21/26; G01C 21/3602; H04N 7/188
USPC ........................................................ 348/148
See application file for complete search history.

(56) References Cited

U.S. PATENT DOCUMENTS

| 6,215,523 B1* | 4/2001 | Anderson .......... H04N 1/00384 348/333.05 |
|---|---|---|
| 2003/0025791 A1* | 2/2003 | Kaylor ............. G08B 13/19628 348/143 |
| 2006/0132602 A1* | 6/2006 | Muto ....................... H04N 7/18 348/148 |
| 2006/0242680 A1* | 10/2006 | Johnson ............. H04N 7/17318 725/105 |

(Continued)

FOREIGN PATENT DOCUMENTS

| CN | 101033978 A | 9/2007 |
|---|---|---|
| CN | 100530265 C | 8/2009 |

(Continued)

OTHER PUBLICATIONS

First Search for CN 201310547847, completed by the Chinese Patent Office dated Jun. 16, 2017, 1 page.

(Continued)

*Primary Examiner* — Mainul Hasan
(74) *Attorney, Agent, or Firm* — Brooks Kushman P.C.

(57) ABSTRACT

A vehicle image capture system may include a vehicle mounted image capture device adapted to capture one or more images external of a vehicle, a navigation system adapted to determine an instantaneous position of the vehicle, and a user interface arranged to allow a user to input a first position. The system is adapted to compare an instantaneous position of the vehicle with the first position, and to capture one or more images if the instantaneous position of the vehicle and the first position are within a predetermined proximity.

10 Claims, 4 Drawing Sheets

(56) References Cited

U.S. PATENT DOCUMENTS

| | | |
|---|---|---|
| 2008/0051997 A1 | 2/2008 | Rosenberg |
| 2009/0177378 A1* | 7/2009 | Kamalski ............... G01C 21/26 701/408 |
| 2010/0141736 A1 | 6/2010 | Hack |
| 2011/0106434 A1* | 5/2011 | Ishihara ................ G01C 21/26 701/533 |
| 2012/0310772 A1 | 12/2012 | Morlock |

FOREIGN PATENT DOCUMENTS

| | | |
|---|---|---|
| CN | 102509451 A | 6/2012 |
| CN | 102607579 A | 7/2012 |
| WO | 2008128348 A1 | 10/2008 |
| WO | 2011053335 | 5/2011 |

OTHER PUBLICATIONS

First Office Action for CN 201310547849, completed by the Chinese Patent Office dated Jun. 27, 2017, including English language translation, 12 pages all together.
Office Action for EP 12191668.8, completed by the European Patent Office dated Dec. 22, 2017, 8 pages.
Second Office Action for CN 201310547849, completed by the Chinese Patent Office dated Feb. 24, 2018, including language translation, 14 pages all together.
Supplemental Search for CN 201310547847, completed by the Chinese Patent Office dated Feb. 8, 2018, 1 page.
Extened European Search Report for EP 12191668.8, Completed by the European Patent Office dated Apr. 5, 2013, 5 Pages.

* cited by examiner

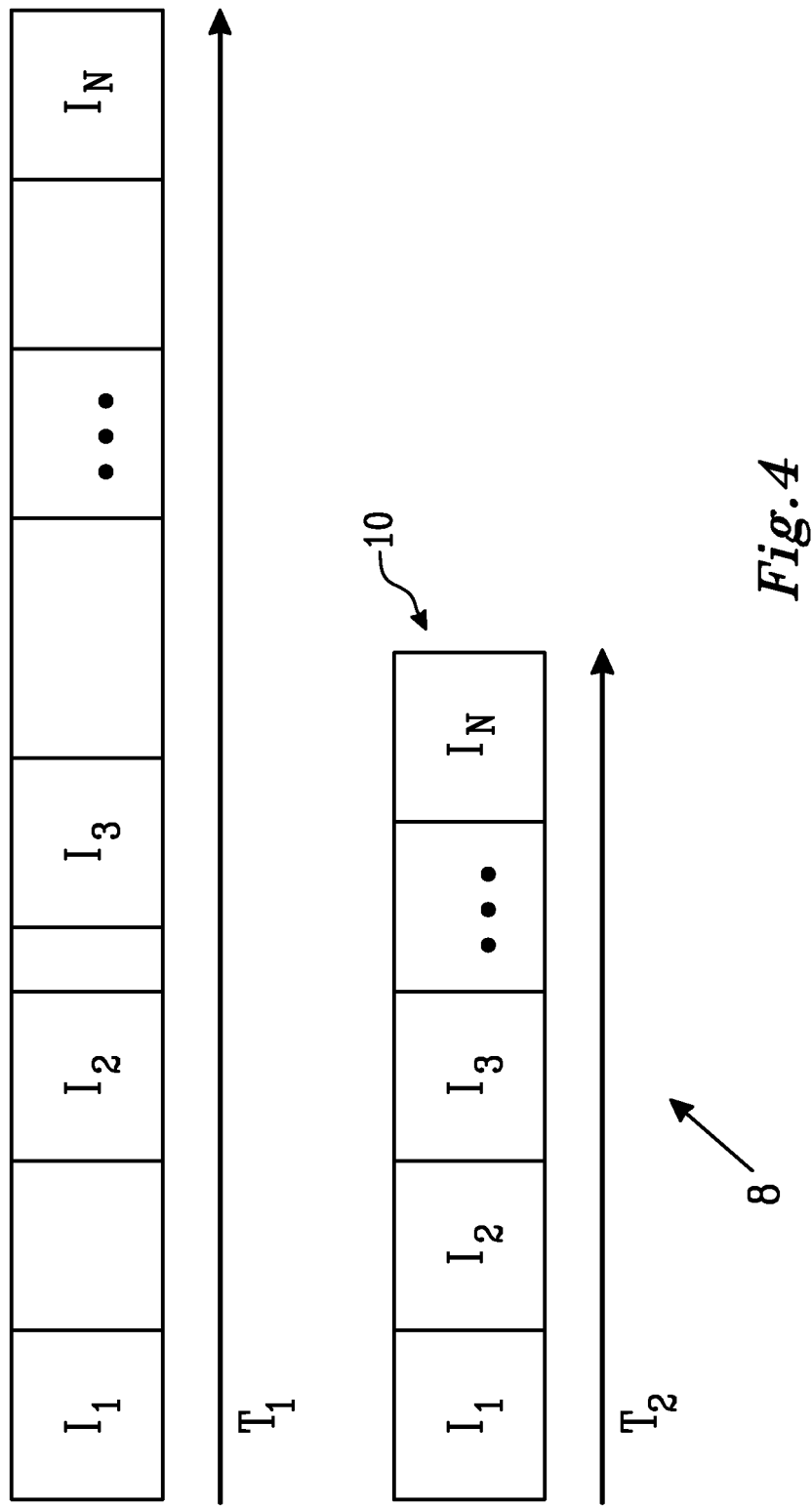

VEHICLE IMAGE CAPTURE CORPORATION

CROSS-REFERENCE TO RELATED APPLICATIONS

This application claims priority to European Patent Application No. 12191668.8 filed Nov. 7, 2012, the disclosure of which is incorporated in its entirety by reference herein.

TECHNICAL FIELD

The present disclosure relates to a vehicle image capture system. The present disclosure further relates to a vehicle comprising a vehicle image capture system.

BACKGROUND

Vehicles are often driven repetitively along a certain route. If a user of a vehicle for example commutes between his home and his workplace, he may choose to drive the same route for several days every week over periods of months or years. Along the route there may be objects he needs to or would like to take pictures of. Situations may arise, when he would like to take several pictures of the same object over a period of time. For example, he may want to obtain documentation of the development of a construction site next to the road, or he may want to collect information regarding which part of the year a particular passage of the road is flooded.

It may be inconvenient or associated with risks to stop and exit the vehicle at the time when he would like to take pictures of an object or position along his route. It may also be associated with risks if he shares focus between driving and taking pictures manually with a camera from a position within the vehicle. In addition, it may be difficult to take similar pictures from the same position using a hand held camera.

The document WO 2011053335 A1 discloses a method for detecting e.g. objects along a navigable street. The method includes placing a GPS system with a user interface screen in a vehicle. The GPS is connected to a forward facing camera for capture still images. Following capture the images are geocoded, and the result is a series of geocoded pictures along a route.

The document US 2008051997 A1 discloses a system for creating and providing interactive access to a street-based photographic image database. Images are automatically collected at incremental distances along each of a plurality of streets of travel, each of the images are indexed with respect to unique correlation data.

If many vehicles equipped with the image capture systems travel along the same streets the result is a large number of images captured for the same or similar location collected by several different vehicles. In those cases, US 2008051997 A1 suggests to reduce the number of images taken at a certain location.

The document US2010141736 A1 discloses a method for assembling a database of geographically related images. The method employs a computer, which is interconnected with a GPS transceiver and distance measurement means and a digital camera arranged on a moving vehicle for taking a plurality of geographic location related images. The camera takes a photo which is stored for post-processing. The post-processing determines a path traveled by the vehicle using the positions and distance measurements and assigns an accurate geographic location and orientation to each photo. The method is useful in building a database of geographically related images.

SUMMARY

An object of the present disclosure is to facilitate for a user of a vehicle to capture images of a first chosen positions while driving along a route.

According to an aspect of the disclosure, the object is achieved by a vehicle image capture system, the system comprising a vehicle mounted image capture device being adapted to capture one or more images external of a vehicle, a navigation system and a user interface being arranged to allow a user to input a first position, and wherein The image capture device, the navigation system and the user interface being adapted to communicate with each other. The image capture system is adapted to compare an instantaneous position of the vehicle with the first position, and if the instantaneous position of the vehicle and the first position are within a predetermined proximity, to capture one or more images.

Since the user may choose the first position before he starts the driving, or at any other occasion he finds convenient, he may focus on the driving and let the vehicle image capture system capture pictures of the desired first position. As a result, the above mentioned object is achieved.

An object of the present disclosure is to facilitate for a user that would like to capture images a preselected number of times, such as every time, of one or more chosen positions while driving along a route. If he, for example, decides that he would like the system to capture an image of a first position every time he drives on a route that passes the first position, the vehicle image capture system may capture several different images taken at the first position, or within the predetermined proximity of the first position, at several different occasions.

According to an aspect of the disclosure, the image capture system comprises an image capture device arranged to capture one or several images a preselected number of times, such as every time, when the instantaneous position of the vehicle and the first position are within a predetermined proximity, resulting in a series of images $I_1$, $I_2$, $I_3$, ... $I_N$ captured within the predetermined proximity of the first position. As a result, the above mentioned object is achieved.

An object of the present disclosure is to facilitate for a user that would like to see or share the captured images, and/or facilitate for a user that would like to choose a selected motif when he or she would like to capture images of a selected position.

According to an aspect of the disclosure, the user interface of the image capture system comprises a display suitable for presenting the series of images $I_1$, $I_2$, $I_3$, ... $I_N$. As a result, the above mentioned object is achieved.

An object of the present disclosure is to facilitate for a user that would like to see or share the captured images sorted after each other, such that the captured images may be viewed as a movie clip on a display.

According to an aspect of the disclosure, the image capture system comprises processing means arranged to sort chronologically the series of images $I_1$, $I_2$, $I_3$, ... $I_N$ and present the chronologically sorted series of images along a timeline on a display, and that the user interface further is arranged to allow a user to scroll along the timeline for presenting the series of images $I_1$, $I_2$, $I_3$, ... $I_N$ as a movie clip. As a result, the above mentioned object is achieved.

An object of the present disclosure is to increase the sorting possibilities and improve the quality of at least some of the selected images.

According to an aspect of the disclosure, the image capture system includes an object recognition system. As a result, the above mentioned object is achieved.

An object of the present disclosure is to provide a series of images $I_1, I_2, I_3, \ldots I_N$, wherein representative objects and/or reference objects on at least one image have a similar position with respect to a frame or edge of the image as the position with respect to a frame or edge of the image of at least one other image in the series of images $I_1, I_2, I_3, \ldots I_N$. Preferably representative objects and/or reference objects on all, or at least a major part of the images in the series of images $I_1, I_2, I_3, \ldots I_N$, are positioned in a similar position with respect to a frame or edge of the image.

According to an aspect of the disclosure, the image capture system comprise an image capture device arranged to capture several images in a sequence every time the instantaneous position of the vehicle and the first position are within a predetermined proximity, and that the object recognition system is arranged to select an image among the several images which selected image is added to the series of images $I_1, I_2, I_3, \ldots I_N$, and in that that the selection of an image among the several images is based on at least one characteristic of the selected image. As a result, the image wherein a representative object and/or reference object of an image is captured from a vehicle position such that the position of the representative object and/or reference object is closest to the position of the representative object and/or reference object of other images in the series of images $I_1, I_2, I_3, \ldots I_N$, may be selected. Thus, the above mentioned object is achieved.

An object of the present disclosure is to facilitate for a user of a vehicle to capture images of one or more chosen positions while driving along a route in a certain direction. If a user of a vehicle travels along a route in a first direction and in a second direction, an object of the present disclosure is to facilitate for a user of a vehicle that would like to capture images of one or more chosen positions along the route only when the vehicle approaches the one or more chosen positions from a first or second direction.

According to an aspect of the disclosure, the image capture system is arranged to capture one or more images only when the vehicle is approaching the first position from a preselected direction. As a result, the above mentioned object is achieved.

An object of the present disclosure is to facilitate for a user of a vehicle to capture images of two or more positions while driving along a route.

According to an aspect of the disclosure, the image capture system comprises a user interface, wherein the user interface is arranged to allow a user to input two or more different positions, and that the image capture system is adapted to compare an instantaneous position of the vehicle with the two or more positions, and if the instantaneous position of the vehicle and any one of the two or more positions are within a predetermined proximity, to capture one or more images. As a result, the above mentioned object is achieved.

An object of the present disclosure is to facilitate for a user that would like to share the captured images to, or see the captured images on, an electronic presentation device such as a computer, tablet computer, laptop, smartphone, PDA, TV or the like.

According to an aspect of the disclosure, the image capture system is arranged to send and/or receive data to/from one or more electronic presentation devices. As a result, the above mentioned object is achieved.

An object of the present disclosure is to facilitate for a person that would like to travel along a route to capture images of a first chosen position while driving along a route.

According to an aspect of the disclosure, the object is achieved by a vehicle that comprises a vehicle image capture system. As a result, the above mentioned object is achieved.

Further features of, and advantages with, the present disclosure will become apparent when studying the appended claims and the following detailed description. Those skilled in the art will realize that different features of the present disclosure may be combined to create embodiments other than those described in the following, without departing from the scope of the present disclosure, as defined by the appended claims.

BRIEF DESCRIPTION OF THE DRAWINGS

The various aspects of the disclosure, including its particular features and advantages, will be readily understood from the following detailed description and the accompanying drawings, in which:

FIG. 4 illustrates timelines according to certain embodiments of a vehicle image capture system.

DETAILED DESCRIPTION

As required, the present disclosure will now be described more fully with reference to the accompanying drawings, in which example embodiments are shown. Disclosed features of example embodiments may be combined as readily understood by one of ordinary skill in the art to which this disclosure belongs. Like numbers refer to like elements throughout. The figures are not necessarily to scale, and some features may be exaggerated or minimized to show details of particular components. Therefore, specific structural and functional details disclosed herein are not to be interpreted as limiting, but merely as a representative basis for teaching one skilled in the art. Well-known functions or constructions will not necessarily be described in detail for brevity and/or clarity.

Figure 1:
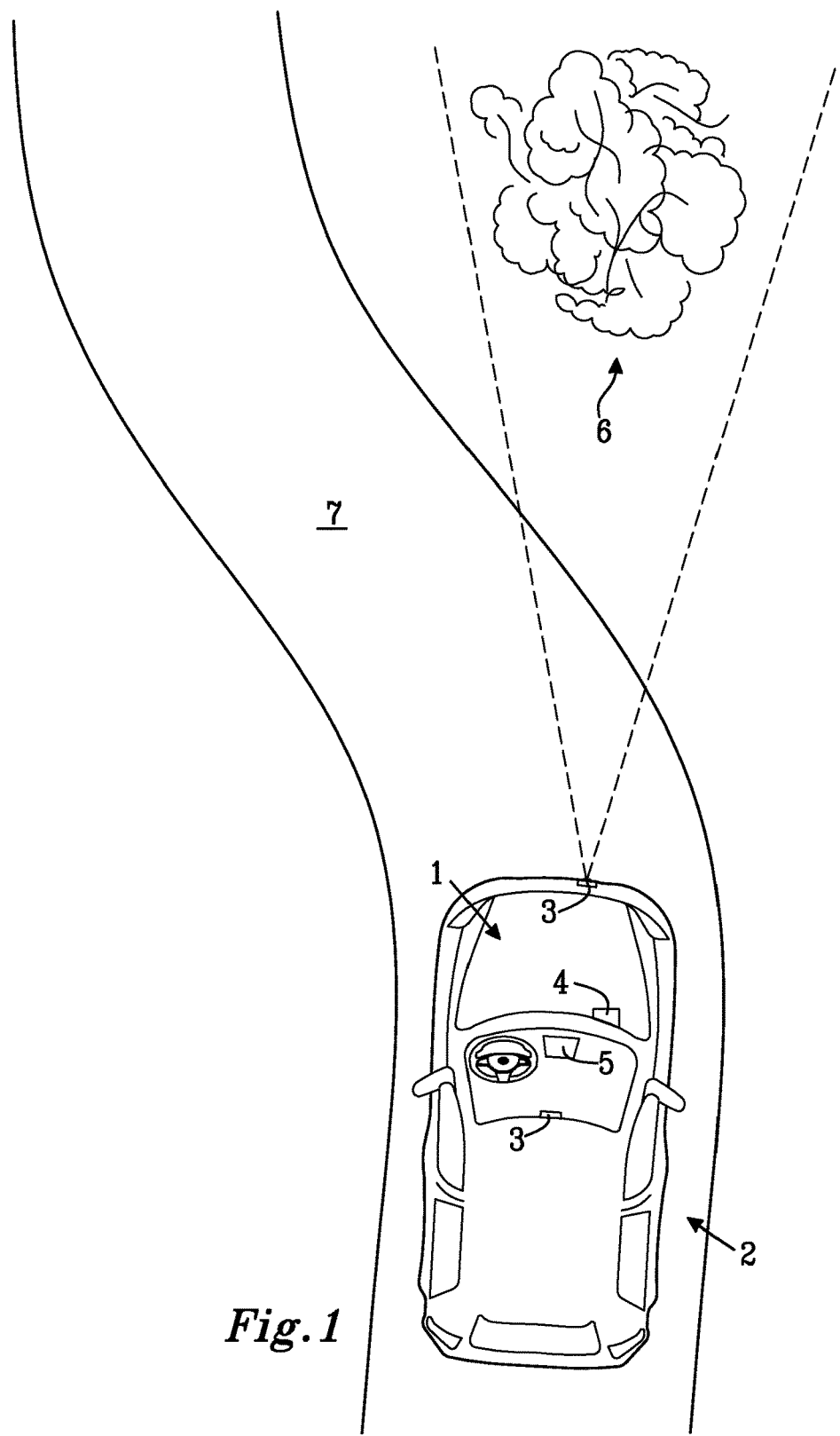
FIG. 1 illustrates a top view of a vehicle image capture system.

FIG. 1 illustrates a vehicle 2 and a vehicle image capture system 1. The vehicle 2 may be a car, minivan, sport utility vehicle, recreational vehicle, truck, motorcycle or the like. In FIG. 1 a car is illustrated.

The vehicle image capture system 1 comprises a vehicle mounted image capture device 3 being adapted to capture one or more images I external of the vehicle 2, a navigation system 4 and a user interface 5 being arranged to allow a user to input a first user-selected position. The navigation system 4 may comprise a combined satellite based positioning an mapping system, such as the American Global Positioning System (GPS), the European Galileo global navigation satellite system (GNSS), the Russian Globalnaya Navigatsionnaya Sputnikovaya Sistema or Global Navigation Satellite System (GLONASS) or the Chinese BeiDou (Compass) Navigation Satellite System.

The image capture device 1 may be a camera, such as a HD-camera, night vision camera, IR-camera, high-speed camera, digital camera or movie camera for capture images. The camera may be used in combination with a lens, such as an optical or digital lens, a widescreen lens, a magnifying lens or a zoom lens. The image capture device 1 may be a vehicle mounted camera facing in a direction external of the vehicle 2. For example an existing forward facing camera which is used also for other purposes, such as safety purposes or parking aid, may be used. The camera may face forward, rearward or in any other direction from the vehicle 2. The camera may be mounted at or in the vicinity of a windscreen, grille or rear-view mirror of the vehicle. The camera may be arranged to capture images from a perspective corresponding to the perspective a driver or user of the vehicle will have while seated in a driver or passenger seat of the vehicle 2.

The image capture device 3, the navigation system 4 and the user interface 5 may be adapted to communicate with each other by any suitable means, such as via a controller area network (CAN), or any other vehicle based network.

The image capture system 1 may further be adapted to compare an instantaneous position of the vehicle with a position selected by a user. For example, the navigation system 4 may be used for the comparison. The image capture system 1 may e.g. use a navigation system 4 such as a global positioning system (GPS) in order to compare the relation between a position or positions given by a user and the instantaneous position of the vehicle 2. If the instantaneous position of the vehicle 2 and the position selected by the user are within a predetermined proximity, the image capture system 1 may be adapted to capture one or more images. The image capture system 1 may provide location based footage, or location based image capturing, wherein the image capture system 1 only capture images if an instantaneous position of the vehicle 2 and a first position selected by a user are within a predetermined proximity.

The images may be provided with information regarding the position where the images where captured, such as geo-tagging. The image capture system 1 may save and/or display other information related to the images captured, such as weather, temperature, captured audio information, road conditions etc. The image capture system 1 may communicate with other systems in order to collect, save or display information.

The image capture system 1 may further be arranged to capture images of parts of the environment surrounding the vehicle 2. The image capture system 1 may still further be arranged to capture images of any objects or motifs within a certain distance from the vehicle 2.

FIG. 1 illustrates a vehicle 2 seen from above at a position where a user has decided he would like to have pictures taken by the image capture system 1. When the navigation system 4 detects the vehicle 2 within a predetermined proximity of a user selected position, the image capture device 3 is arranged to start to capture images of a motif 6, e.g. in front of the vehicle 2. In FIG. 1 the motif 6 is represented by a tree. The image capture system 1 may capture several images while the vehicle 2 is moving along a route 7 within the predetermined proximity of the selected position. The route 7 is represented by a road in FIG. 1. The image capture system 1 may subsequently select and save one or more images of the several images taken. The selection of an image I among the several images may be based on one or more characteristics of the selected image I, such as how objects are located with respect to an edge or frame of the image I, or based on the sharpness or brightness of the images. The selected images may form a series of images $I_1, I_2, I_3, \ldots I_N$. The image capture system 1 may be arranged to select an image I among the several images, such that objects represented in the image I have a similar position with respect to an edge or frame of the image as the corresponding objects have in other images in the series of images $I_1, I_2, I_3, \ldots I_N$. Thanks to this, a person watching the images being displayed in sequence, one after another, may be able to perceive the series of images $I_1, I_2, I_3, \ldots I_N$ as a movie clip, wherein objects have the same or similar positions in different images.

The image capture system 1 may be arranged to capture one or several images at a preselected number of instances when the instantaneous position of the vehicle and the first position are within a predetermined proximity. For instance, a user may select to let the image capture system 1 take one or several images every time the vehicle 2 is within a predetermined proximity of the user selected position. The image capture system 1 may be arranged to capture images every second time the vehicle 2 is within a predetermined proximity of the user selected position, or only if the vehicle 1 is within a predetermined proximity of the user selected position during certain periods of the day, such as during mornings and evenings.

Figure 2:
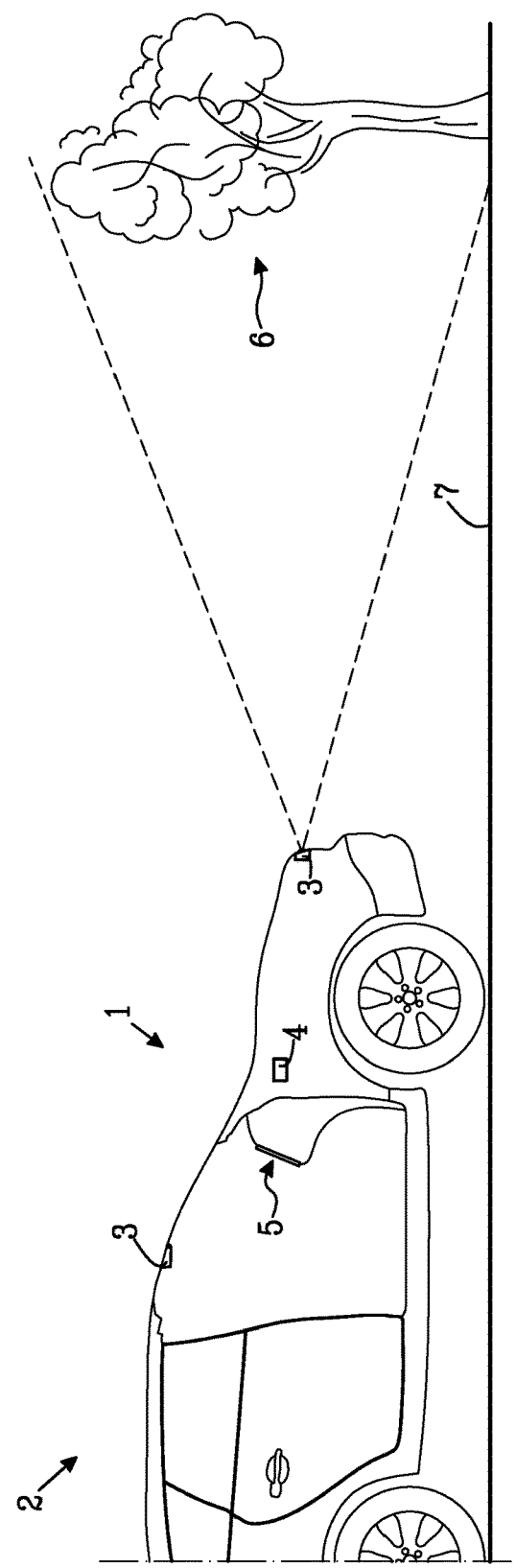
FIG. 2 illustrates a side view of a vehicle image capture system.

FIG. 2 illustrates the image capture system 1 including the image capture device 3, the navigation system 4, and the user interface 5 in vehicle 2 from a side view at a position on a route 7 where a user has decided he would like to have pictures captured by the image capture system 1.

When the navigation system 4 detects that the vehicle 2 is within a predetermined proximity of a first position selected by the user the image capture device 3 is arranged to start to capture images of a motif 6 in front of the vehicle 2. In FIG. 2 the motif is represented by a tree. The image capture device 3 may be arranged in a front part of the vehicle 2, such as at or in the vicinity of a windscreen or grille as illustrated in FIG. 2. In FIG. 2 the periphery of a captured image I between an image capture device 3 and the motif 6 is outlined.

Figure 3:
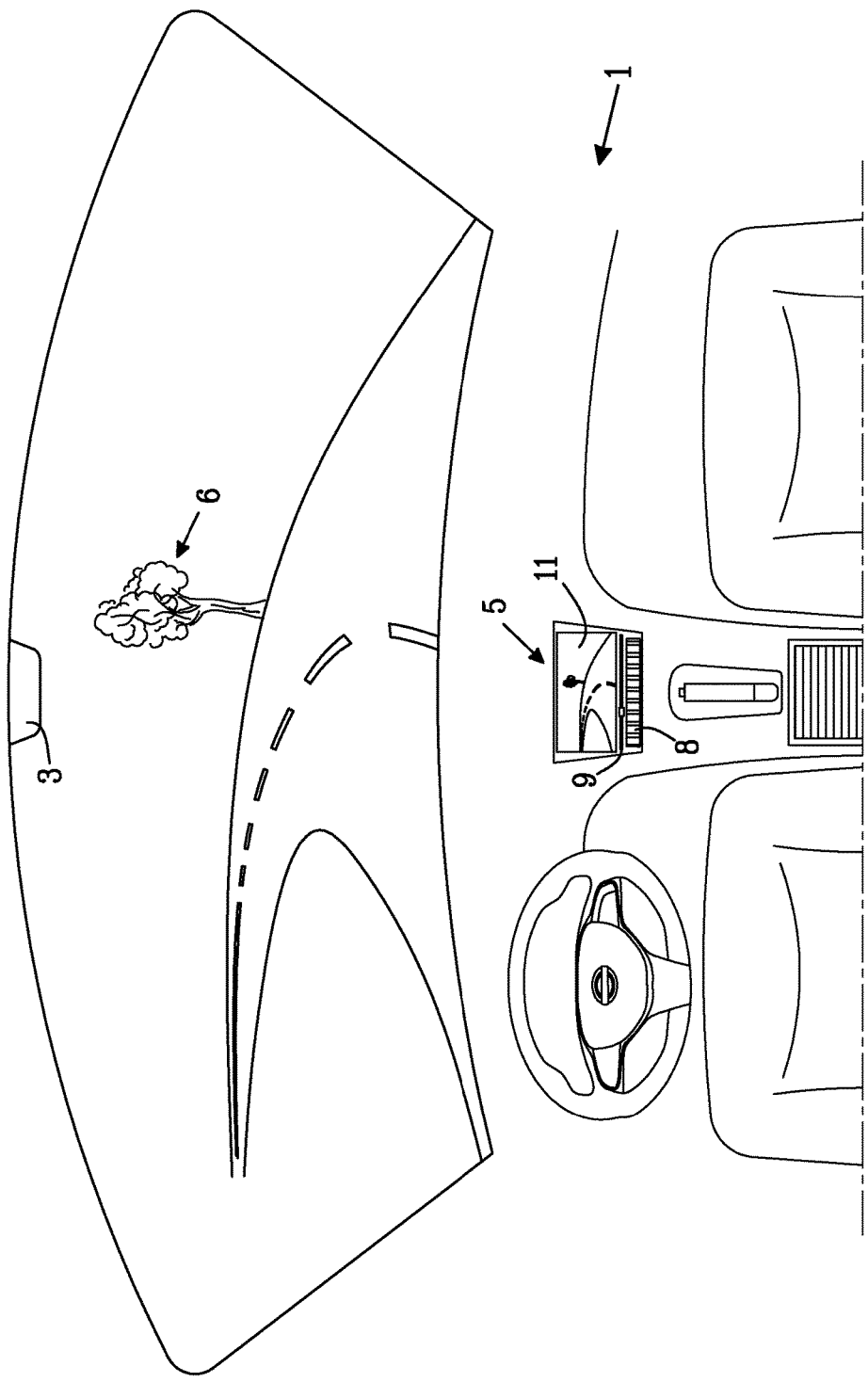
FIG. 3 illustrates a vehicle image capture system according to certain embodiments seen from an interior of a vehicle.

FIG. 3 illustrates an interior of a vehicle provided with the image capture system 1. According to the embodiment of FIG. 3, the user interface 5, including the display 11, timeline 8 and scrolling means 9, is arranged in a centre stack. In other embodiments the user interface 5 may be arranged in other positions, such as on or in the vicinity of the dashboard, windscreen, door interior or steering wheel.

The image capture device 1, the navigation system 4 and the user interface 5 illustrated in FIG. 3 may be adapted to communicate with each other via a controller area network (CAN), or any other vehicle based network and/or communication means.

As illustrated in FIG. 3, a representation of objects or motifs 6 as seen through the image capture device 3 may be presented on a display 11. The display 11 may be part of the user interface 5. The display 11 may be used if a user would like to select a certain motif when capturing images of a selected position. The display 11 may be a touch screen, permitting a user to input data. For example, a user may select motif, extension of an image, focus areas, colours etc. on the display. The display may be arranged to permit a user to tag images, e.g. tagging of persons or geographical positions. The image capture system may be arranged to display one or more user selected positions on a map. A user interface 5 or a display 11 may be used for other purposes, such as navigation, communicating or entertainment. A user interface or display arranged in another system may be arranged to be used also in the image capture system 1.

Through a zoom lens or the like, a user may transfer a focal point from a first distance from the vehicle 2 to a second distance from the vehicle 2. Thus, a user may be able to zoom such that an object on an image I captured by the image capture device 3 may be located at any desired distance from the vehicle 1. The image capture system 3 may therefore be used for the capture of close-up images near the vehicle 2, or for the capture of motifs further away from the vehicle 2, such as a horizon or sunset.

The image capture device 3 may include auto-focus or the like, for capture of high quality images I. Characteristics of the image capture device 3 may depend on different factors such as speed of the vehicle 2, light conditions or road conditions.

The image capture system 1 may comprise processing means arranged to sort chronologically the series of images $I_1, I_2, I_3, \ldots I_N$ and present the chronologically sorted series of images along a timeline 8 on a display 11 of the user interface 5. The processing means or processor may include a microprocessor, microcontroller, programmable digital signal processor (DSP) or another programmable device. The processing means or processor may also, or instead, include an application specific integrated circuit (ASIC), a programmable gate array or programmable array logic, a programmable logic device, or a digital signal processor (DSP). Where the processing means or processor includes a programmable device such as a microprocessor, microcontroller or programmable digital signal processor, the processing means or processor may further include computer executable code that controls operation of the programmable device.

A user interface 5 of the image capture system 1 may be arranged to allow a user to scroll along the timeline for presenting the series of images $I_1, I_2, I_3, \ldots I_N$ as a movie clip 10. For instance, when scrolling in one direction the movie clip is played forwards and when scrolling in a second direction the movie clip is played backwards. In FIG. 3 the timeline 8 and scrolling means 9 are arranged at the display 11 of the user interface 5. However, the timeline 8 and scrolling means 9 may be arranged in the vicinity of or separate from the display 11.

FIG. 4 illustrates two timelines $T_1$ and $T_2$. Timeline $T_1$ represents a number of different occasions when images $I_1, I_2, I_3, \ldots I_N$ are captured. Any amount of time may pass between the occasions when the images $I_1, I_2, I_3, \ldots I_N$ are captured. If a user selects a first position where he would like the image capture system 1 to capture images, and he seldom drives a route that passes by the first position, it may take days, weeks, months or even years between capture of the images $I_1, I_2, I_3, \ldots I_N$. The length of the timeline $T_1$ may represent the span of the total amount of time between the capture of a first image $I_1$ to the capture of an image $I_N$.

Timeline $T_2$ represents the images $I_1, I_2, I_3, \ldots I_N$, as the images are arranged together for facilitating the images being viewed on a display 11. The image capture system 1 comprises processing means arranged to sort chronologically the series of images $I_1, I_2, I_3, \ldots I_N$ and present the chronologically sorted series of images along a timeline 8 on the display 11. The user interface 5 is arranged to allow a user to scroll along a timeline for presenting the series of images $I_1, I_2, I_3, \ldots I_N$ as a movie clip 10. The span of the timeline $T_2$ may represent the length of the movie clip 10.

The phenomena of showing frames or pictures on a display 11 at a higher frame rate than the rate of which the images or pictures were taken is sometimes referred to as time lapse photo or time lapse footage. The movie clip 10 may be displayed with a desired number of images per time unit. The number of images per second is generally expressed as frame rate. Movie clips or films are often presented at a frame rate of 24 frames/s, which means that 24 subsequent images appear on the display 11 every second. The user interface 5 is arranged to allow a user to scroll along the timeline 8 for presenting the series of images $I_1, I_2, I_3, \ldots I_N$ at any frame rate, such as e.g. 1-50 frames per second. If a user scrolls at a high speed, the number of frames displayed each second may be higher than if a user scrolls at a lower speed.

As indicated in FIG. 4, $T_1$ is larger than $T_2$. One or more of the images $I_1, I_2, I_3, \ldots I_N$ may be blurred part of the time or all of the time the series of images $I_1, I_2, I_3, \ldots I_N$ are displayed on the display 11. Thanks to this a user watching the movie clip 10 may perceive the changes between the different images to be smoother and more linear.

Although the disclosure has been described with reference to example embodiments, many different alterations, modifications and the like will become apparent for those skilled in the art. A timeline 8, series of images $I_1, I_2, I_3, \ldots I_N$, or movie clip 10 may for instance be arranged to be displayed at internet pages and/or social networks such as twitter, Facebook, Instagram or the like. In addition, more than one image capturing system 1, arranged in two or more vehicles 2 may be arranged to communicate or interact. For example, a common series of images $I_1, I_2, I_3, \ldots I_N$ in where different images origin from different image capture systems 1 may be collected, saved and/or displayed.

While exemplary embodiments are described above, it is not intended that these embodiments describe all those possible. Rather, the words used in the specification are words of description rather than limitation, and it is understood that various changes may be made. Additionally, the features of various implementing embodiments may be combined to form further embodiments.

What is claimed is:

1. An image capture system for use in a vehicle, the system comprising:
   an image capture device adapted to be mounted in a vehicle and to capture one or more images external of the vehicle, wherein the image capture system includes an object recognition system;
   a navigation system comprising a positioning system; and
   a user interface adapted to be mounted in the vehicle to allow a user in the vehicle to input a first position and a direction, wherein the image capture device, the navigation system, and the user interface are adapted to communicate with each other;
   wherein the image capture system is adapted to, while the vehicle is driven along a route, compare an instantaneous position of the vehicle with the first position, and in response to the instantaneous position of the vehicle and the first position being within a predetermined proximity, the image capture device is adapted to capture one or more images;
   wherein the image capture device is adapted to capture one or more images a preselected plural number of times on different dates in response to the instantaneous position of the vehicle being within a predetermined proximity of the first position, resulting in a series of images captured on different dates within the predetermined proximity of the first position;
   wherein the image capture device is adapted to capture one or more images only in response to the vehicle approaching the first position from the direction input to the user interface; and
   the image capture system further comprising processing means configured to sort chronologically the series of images and present the chronologically sorted series of images along a timeline on a display, and wherein the user interface is further arranged to allow a user to scroll along the timeline to present the series of images as a movie clip; and wherein the image capture device is adapted to capture several images in a sequence every time the instantaneous position of the vehicle and the first position are within a predetermined proximity, and that the object recognition system is adapted to select an image among the several images which selected image is added to the series of images, and wherein the selection of an image among the several images is based on at least one characteristic of the selected image.

2. The image capture system according to claim 1, wherein the user interface of the vehicle image capture system further comprises a display suitable for presenting the series of images.

3. The image capture system according to claim 1, wherein the user interface further is to allow a user to input two or more different positions, and that the image capture system is adapted to compare an instantaneous position of the vehicle with the two or more positions, and if the instantaneous position of the vehicle and any one of the two or more positions are within a predetermined proximity, to capture one or more images.

4. The image capture system according to claim 1, wherein the image capture system is adapted to send data to and/or receive data from one or more electronic presentation devices.

5. A vehicle comprising a vehicle image capture system according to claim 1.

6. An image capture system for use in a vehicle, the system comprising:
an image capture device adapted to be mounted in a vehicle and to capture one or more images external of the vehicle;
an object recognition system;
a user interface adapted to be mounted in the vehicle to allow a user in the vehicle to input a first position and a direction; and
a processor configured to compare an instantaneous position of the vehicle determined by a vehicle navigation system with the first position and, in response to the instantaneous position of the vehicle and the first position being within a predetermined proximity, to communicate with the image capture device to capture one or more images;

wherein the image capture device is adapted to, while the vehicle is driven along a route, capture one or more images a preselected plural number of times on different dates in response to the instantaneous position of the vehicle being within a predetermined proximity of the first position, resulting in a series of images captured on different dates within the predetermined proximity of the first position;

wherein the image capture device is adapted to capture one or more images only in response to the vehicle approaching the first position from the direction input to the user interface;

wherein the processor is configured to sort chronologically the series of images and present the chronologically sorted series of images along a timeline on a display, and the user interface is further arranged to allow a user to scroll along the timeline to present the series of images as a movie clip; and wherein the image capture device is adapted to capture several images in a sequence every time the instantaneous position of the vehicle and the first position are within a predetermined proximity, the object recognition system is adapted to select an image among the several images which selected image is added to the series of images, and the selection of an image among the several images is based on at least one characteristic of the selected image.

7. The image capture system of claim 6 wherein the user interface of the vehicle image capture system further comprises a display suitable for presenting the series of images.

8. The image capture system of claim 6 wherein the user interface is further adapted to allow a user to input two or more different positions, and the processor is adapted to compare an instantaneous position of the vehicle with the two or more positions, and if the instantaneous position of the vehicle and any one of the two or more positions are within a predetermined proximity, to communicate with the image capture device to capture one or more images.

9. The image capture system of claim 6 wherein the processor is configured to send and/or receive data to/from one or more electronic presentation devices.

10. A vehicle comprising a vehicle image capture system according to claim 6.

* * * * *

UNITED STATES PATENT AND TRADEMARK OFFICE
CERTIFICATE OF CORRECTION

PATENT NO. : 10,356,373 B2
APPLICATION NO. : 14/063217
DATED : July 16, 2019
INVENTOR(S) : Joakim Christoffersson et al.

It is certified that error appears in the above-identified patent and that said Letters Patent is hereby corrected as shown below:

In the Claims

Column 9, Line 19, Claim 3:
After "wherein the user interface further is"
Insert -- adapted --.

Signed and Sealed this
Twenty-fourth Day of December, 2019

Andrei Iancu
*Director of the United States Patent and Trademark Office*